(12) United States Patent
Opiela et al.

(10) Patent No.: US 10,279,780 B2
(45) Date of Patent: May 7, 2019

(54) ARRANGEMENT OF AIR OUTLETS ON A MOTOR VEHICLE AIR CONDITIONING UNIT

(71) Applicant: VISTEON GLOBAL TECHNOLOGIES, INC., Van Buren Township, MI (US)

(72) Inventors: Mario Opiela, Aachen (DE); Johannes Stausberg, Cologne (DE)

(73) Assignee: HANON SYSTEMS, Daejeon-si (KR)

( * ) Notice: Subject to any disclaimer, the term of this patent is extended or adjusted under 35 U.S.C. 154(b) by 1031 days.

(21) Appl. No.: 13/961,156

(22) Filed: Aug. 7, 2013

(65) Prior Publication Data
US 2014/0045416 A1 Feb. 13, 2014

(30) Foreign Application Priority Data
Aug. 7, 2012 (DE) .......................... 10 2012 107 230

(51) Int. Cl.
*B60S 1/02* (2006.01)
*B60S 1/54* (2006.01)
*B60H 1/24* (2006.01)

(52) U.S. Cl.
CPC .............. *B60S 1/023* (2013.01); *B60H 1/247* (2013.01); *B60S 1/54* (2013.01)

(58) Field of Classification Search
CPC ............................ B60S 1/023; B60H 1/00064
See application file for complete search history.

(56) References Cited

U.S. PATENT DOCUMENTS

| 5,309,731 | A  | * | 5/1994 | Nonoyama | ........ | B60H 1/00849 62/244 |
|---|---|---|---|---|---|---|
| 6,186,886 | B1 | * | 2/2001 | Farrington | ............. | B60H 1/243 454/124 |
| 6,382,518 | B1 | * | 5/2002 | Shibata | .............. | B60H 1/00064 237/12.3 B |
| 6,675,598 | B2 | * | 1/2004 | Kaneura | ............ | B60H 1/00028 62/244 |
| 2003/0096571 | A1 | * | 5/2003 | Kondo | ............... | B60H 1/00064 454/156 |
| 2004/0018812 | A1 | * | 1/2004 | Tanoi | ................. | B60H 1/00064 454/121 |
| 2004/0194948 | A1 | * | 10/2004 | Shibata | .............. | B60H 1/00064 165/204 |
| 2006/0021424 | A1 | * | 2/2006 | Ishikawa | ............ | B60H 1/00064 73/114.01 |

(Continued)

FOREIGN PATENT DOCUMENTS

DE 3610188 A1 1/1987
DE 19548983 C1 2/1996
(Continued)

*Primary Examiner* — Steven B McAllister
*Assistant Examiner* — Steven S Anderson, II
(74) *Attorney, Agent, or Firm* — Shumaker, Loop & Kendrick, LLP; James D. Miller

(57) ABSTRACT

An arrangement of air outlets on a motor vehicle air conditioning unit, wherein side window outlets, side occupant air outlets, and center occupant or additional vent air outlets are configured as pairs and the side occupant air outlets and the center occupant or additional vent air outlets are arranged in one tier, wherein from outside to inside are, first, the center occupant or additional vent air outlets and then the side occupant air outlets.

16 Claims, 3 Drawing Sheets

(56) References Cited

U.S. PATENT DOCUMENTS

2007/0207719 A1* 9/2007 Blasi .................. B60H 1/00057
454/121
2008/0110184 A1* 5/2008 Hirooka ............. B60H 1/00028
62/97
2010/0178861 A1 7/2010 Sano

FOREIGN PATENT DOCUMENTS

| JP | 60189418 U1 | 12/1985 |
| JP | H10230733 A | 9/1998 |
| JP | 2004203179 A | 7/2004 |
| WO | 03033310 A1 | 4/2003 |

* cited by examiner

ARRANGEMENT OF AIR OUTLETS ON A MOTOR VEHICLE AIR CONDITIONING UNIT

CROSS-REFERENCE TO RELATED APPLICATION

This application claims priority to German Non-Provisional Patent Application Serial No. DE 10 2012 107 230.2 filed Aug. 7, 2012, hereby incorporated herein by reference in its entirety.

FIELD OF THE INVENTION

The present invention relates to an arrangement of air outlets on a motor vehicle air conditioning unit, in particular to air outlets that are connected to the air discharge vents in the front portion of the motor vehicle within the instrument panel.

BACKGROUND OF THE INVENTION

The air outlets of the air conditioning unit, hereinafter referred to as outlets, are the interfaces at which air flow ducts are connected during assembly of the motor vehicle. The air flow ducts, referred to hereinafter as ducts for short, direct the air conditioned in the air conditioning unit to the air discharge vents at defined locations in the motor vehicle, wherein the term air discharge vent is understood to mean the visible openings in the motor vehicle ventilation system, from which the air is directed and from which it flows at a desirable velocity directly into the interior of the motor vehicle.

Outlets of the aforementioned kind are connected directly or by way of ducts with defined air discharge vents. In the selected embodiments the defrost outlet is connected directly to the defrost air discharge vents for supplying air to the front windshield, whereas the side window air outlets are connected with the side window air discharge vents and the side occupant air outlets and center occupant air outlets are connected by way of ducts to the side occupant and center occupant air discharge vents in the instrument panel. For the latter, the terms dashboard vent, air vent, air discharge panel, side or center air nozzle are also frequently use.

An arrangement of air flow ducts is described in U.S. Pat. Appl. Pub. No. 2010/0178861 A1, in which the ducts exiting from the left and the right defrost outlet of the vehicle air conditioning unit are crossed and hence are directed to the right and the left side of the front windshield. This configuration is intended to enable fresh air to exit the air discharge vent at a very shallow angle in the direction of the windshield, thereby also reaching, in sufficient amount, both extreme corners of the windshield, and thus eliminating any frost that may be present. However, this arrangement entails accepting the drawback that the crossover of the air flow ducts requires additional installation space and that the additional components also mean adding weight to the air conditioning system.

A duct arrangement inside the instrument panel is described in PCT Pat. Appl. Pub. No. WO 03/033310 A1, specifically the position of the center occupant air flow ducts in the direction of the front-seat passenger, wherein the problem lies mainly in the positioning of the airbag module and areas of potential head impact in the event of an accident.

Air flow ducts which direct the air to the sides of the motor vehicle are normally longer and hence, exhibit higher loss of pressure than air flow ducts that distribute the air from air discharge vents centrally located in the vehicle interior. To ensure equal distribution of the air volume in the transverse direction of the vehicle, the pressure loss of the former mentioned ducts is increased artificially in prior art implementations by selectively throttling the air flow with the aid of corresponding dampers in the air conditioning unit. However, this results in higher flow velocities in the vicinity of the dampers, which results in a reduction of the overall air volume and a significantly higher level of noise in the vehicle interior must be tolerated. This technical solution also leads to the disadvantages of additional components, additional required installation space, and with that, added weight to the air conditioning system.

Design specifications, such as the placement of a clock, a loud speaker, or a display in the center of the instrument panel frequently also restricts the installation space for the air flow ducts and the center occupant air discharge vents, requiring at the same time greater functionality of the air conditioning unit such as, for example, additional air venting from the instrument panel that is not perceived by the vehicle occupants as a direct air stream, but nevertheless contributes to improved air conditioning of the vehicle interior and is located in the same position as the center occupant air discharge vent in the air conditioning unit. For this purpose, it is necessary to divert the air flow ducts from the center of the air conditioning unit around these additional components by means of appropriate diversions and diameter changes, which also leads to a relatively significant drop in pressure and to greater noise in the passenger compartment.

Moreover, modern vehicle designs frequently necessitate a flatter windshield and reduced height of the installation space for the air conditioning unit, including the air flow ducts and the instrument panel. For this reason, the air flowing from the defrost outlet toward the windshield must be fanned out at increasingly shorter distances over the entire width of the windshield.

In a conventional two-tier arrangement of outlets on a motor vehicle air conditioning unit according to the prior art, as shown in FIG. 1, this problem is exacerbated by the air being tapped from the side-window outlets directly adjacent to the defrost outlet. This further restricts the potential width of the defrost outlet, and thus, given the restricted height of the installation space, impedes the distribution of air over the entire width of the windshield. This effect is inconsistent with the requirement of a balanced air flow distribution at the air discharge vents in the vehicle interior.

SUMMARY OF THE INVENTION

The object of the present invention is to provide a light and cost-effective motor vehicle air conditioning system which, when compared to the prior art, offers a balanced air volume distribution in the vehicle interior, both in the direction of the windshield and in the directions of the side windows and the passengers, while at the same time including an overall greater volume of air, minimal loss of pressure, and low noise level.

The concept according to the invention is that by interchanging the side occupant air outlets and center occupant air outlets or additional vent air outlets, the center occupant air outlets and the additional vent air outlets can be located further outward, thereby allowing straight or nearly straight air flow ducts to be relocated from the air conditioning unit past the central components in the instrument panel to the center occupant air discharge vents or additional discharge vents. To enable each outlet to receive approximately the same proportion of the overall air volume, a combination of length and diameter of the air flow ducts is selected for each corresponding pair of air discharge vents that produces an equivalent flow resistance. However, since the positions of the air discharge vents are predefined, and therefore also the length of the air flow ducts, it is possible only via selection of the diameter to achieve a uniformly distributed air flow. Hence, the longer the air flow ducts to the air discharge vents are configured, the larger is the design of the outlet openings on the air conditioning unit.

According to the invention, the object is achieved by an arrangement of air outlets on a motor vehicle air conditioning unit, wherein the air outlets are the side window outlets, the side occupant air outlets, and the center occupant air outlets or additional vent air outlets. The air outlets are configured in pairs. The side occupant air outlets and the center occupant air outlets are situated in one tier. In an embodiment of the invention, the side occupant air outlets are arranged inwardly in this tier between the center occupant air outlets.

Since the air flow ducts to the side occupant air outlet are relatively long and since this change requires only a small extension, the loss of pressure within these ducts changes very little. The overall noise level is unaffected or not noticeably effected by this. This is confirmed by the subjective perception that the air discharge vents arranged on the outside of both sides of the instrument panel contribute only insignificantly to the noise level within the vehicle interior.

The fact that the air flow ducts to the center occupant air vents are able to guide the air from the side of the air conditioning unit on a nearly straight path with no diversions or diameter changes, results in an imbalance in the velocity distribution to the air discharge vents in the transverse direction of the vehicle. This means that the air flow to the center occupant air discharge vent or additional or additional discharge vent must be reduced. This allows the outlets on the air conditioning device itself to be kept small. In turn, the saved space can be utilized to enlarge the side occupant air outlets. In one embodiment of the invention, the side occupant air outlets on the lower tier may have significantly larger openings as compared to the center occupant air outlets or the additional vent air outlets. In one specific embodiment, the side occupant air outlets have openings that are at least twice as large. The larger sizing of the side occupant air outlet opening cannot in general be specified to the degrees or in proportion to the other outlets, since every air conditioning unit has different requirements with respect to air volume and other parameters. Conceptually, however, it can be noted that the openings for the side occupant air outlets are significantly larger in design in proportion to the other outlets and in proportion to the otherwise standard dimensions according to the prior art.

According to another embodiment of the invention, a defrost outlet is situated on an upper tier and the width of the defrost outlet is more than three times the width of the side occupant air outlets, center occupant air outlets or additional vent air outlets. The larger dimensions of the defrost outlet cannot be established generally in the dimensions of or in proportion to the other outlets, since the requirements are different in each air conditioner unit in terms of the air volumes and other parameters.

Another particular embodiment of the invention consists of the fact that the defrost outlet on the upper tier extends over the entire width of the air conditioning unit. This is because a particularly wide defrost outlet can ensure a uniform flow of air against the windshield at low velocity. The terms, width, and height of outlets used here are defined by the dimensions of these openings in the transverse, respectively perpendicular, direction of the vehicle.

Widening the defrost outlet allows it to be designed especially flat, while maintaining the same cross-sectional area, as a result of which it is possible to save on installation height. In a particular embodiment of the invention, the height of the defrost outlet in the upper tier is merely 30% to 70% of the height of the side occupant air outlets. The specific dimensions are dependent on the installation space and the required volume of air in the air outlets, and for every air conditioning unit these dimensions may differ.

The minimal height of the defrost outlet creates room for an additional tier in which the side window outlets are arranged, wherein the tier for the side window outlets is situated below the tier for the defrost outlet and above the tier for the side occupant and center occupant and the additional air vent outlets and wherein the pair of side window outlets are situated centrally in the middle tier.

Compared to the prior art, the present invention offers the advantage that an air conditioning unit having a balanced air volume distribution can be implemented via the air discharge vents. In addition, an overall greater volume of air is provided with a minimum of pressure loss in the system and lower noise level.

BRIEF DESCRIPTION OF THE DRAWINGS

Further details, features and benefits of embodiments of the invention will emerge from the following description of sample embodiments with reference to the accompanying drawings. There are shown.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
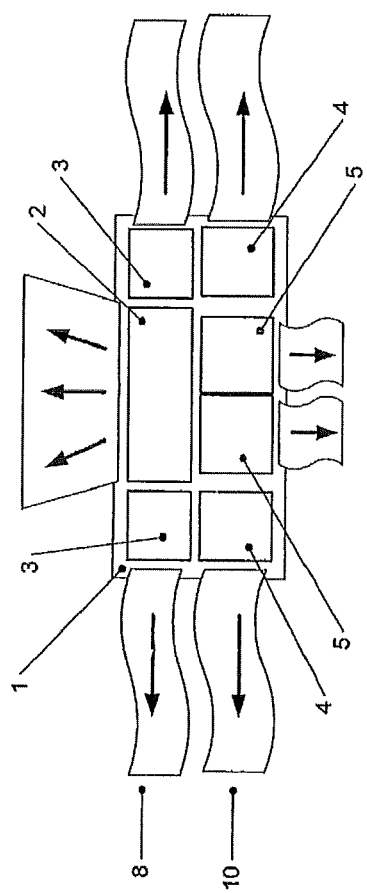
FIG. 1 shows an arrangement of air outlets in an air conditioning unit based on the prior art.

FIG. 1 shows an arrangement of air outlets in a motor vehicle air conditioning unit 1 based on the prior art. Air outlets 2, 3, 4, 5 are situated in two tiers 8, 10 one on top of the other. In embodiments of the invention, the tiers 8, 10 are specifically described in terms of their position relative to one another as an upper tier 8, a lower tier 10 whereby the designation and the specific positions of the tiers 8, 9, 10 are not relevant in terms of understanding or in terms of the inventive concept.

A defrost outlet 2 is normally centrally located in the upper tier 8 and, for the purpose of ventilating the windshield, is significantly wider in design as compared to the other outlets 3, 4, 5. Situated on each side of the defrost outlet 2 are a pair of side window outlets 3, the openings of which are approximately square in shape. Consequently, the width of the defrost outlet 2 is limited by the side window outlets 3, which restricts a full, uniform and adequate ventilation of a windshield.

Situated in the center of the lower tier 10 is a pair of center occupant or additional vent air outlets 5 and to the outside of these a pair of the side occupant air outlets 4. The center occupant or additional vent air outlets 5 and the side occupant air outlets 4 all have a square flow cross-section approximately equal in size.

Where design specifications provide for the additional placement of central components in the instrument panel 11, such as, for example, a clock, a loudspeaker, or a display, the installation space for air flow ducts for connecting the outlets to center occupant air discharge vents or additional air discharge vents is severely restricted.

FIG. 1 shows clearly the overall problem that the length of the air flow ducts between the air outlets 2, 3, 4, 5 and corresponding air discharge vents varies greatly, which leads to varying losses of pressure in the air flow ducts and, hence, to resultant uneven volumes of air. This is inconsistent with the requirement of a balanced air flow distribution at air discharge vents in a vehicle interior.

Figure 2:
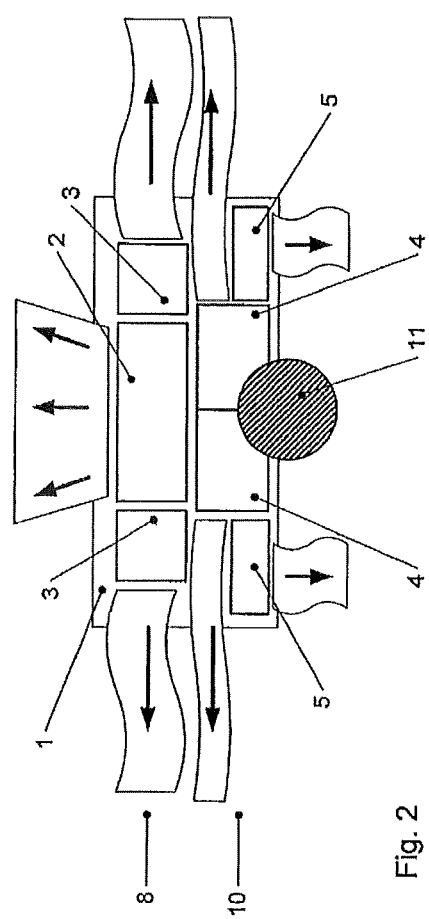
FIG. 2 shows an arrangement of air outlets in an air conditioning unit with interchanged side occupant air outlets and center occupant air outlets and with additional central components in an instrument panel.

FIG. 2 shows an embodiment of the invention in which both pairs of side occupant air outlets 4 and center occupant or additional vent air outlets 5 in the lower tier 10 are interchanged. This means that the pair of side occupant air outlets 4 are centrally disposed and the center occupant or additional vent air outlets 5 are located outside on either side of the side occupant air outlets 4. This allows the air flow ducts to be directed in a straight line from the center occupant or additional vent air outlets 5 to the center occupant air discharge vents or additional air discharge vents on the instrument panel, while still leaving enough installation space available for the required central components in the instrument panel 11.

Shortening and straightening the air flow ducts to the center occupant air discharge vents or additional air discharge vents reduces flow resistances and air flows guided in that direction are strengthened accordingly. The conditions of the airflows to side occupant air discharge vents, however, are changed hardly at all by the change in air outlet positions. To ensure equal air volume distribution and balance of airflows, the side occupant air outlets 4 are configured significantly larger than the center occupant or additional vent air outlets 5.

Figure 3:
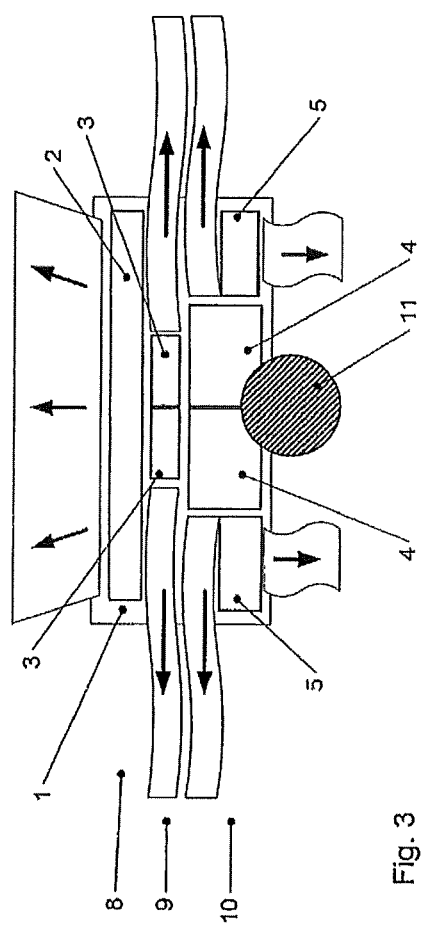
FIG. 3 shows an arrangement of air outlets in an air conditioning unit with a widened defrost outlet and with an additional tier for side window outlets.

FIG. 3 shows a further embodiment of the arrangement of the air outlets 2, 3, 4, 5 of the motor vehicle air conditioning unit 1, which goes beyond the features shown in FIG. 2. The central concept consists in removing the side window outlets 3 from the upper tier 8 and thereby creating additional installation space laterally next to the defrost outlet 2. This makes it possible to significantly widen the defrost outlet 2 laterally up to a maximum width of the motor vehicle air conditioning unit 1. The wider defrost outlet 2 allows for uniform ventilation of a full width of the windshield to its peripheries.

Widening the defrost outlet 2 allows it to be designed very shallow in height while maintaining the same cross-sectional area. Consequently, in a particular embodiment of the invention the height of the defrost outlet 2 in the upper tier 8 is only half of a height of the side occupant air outlets 4.

Finally, the shallow height of the defrost outlet 2 creates space between the upper tier 8 and the lower tier 10 for the middle tier 9, in which the side window outlets 3 are centrally arranged. Even though a height of the side window outlets 3 is restricted by an overall height of the motor vehicle air conditioning unit 1, it is possible by selecting a width of the side window outlets 3 to adapt the area of the side window outlets 3 within certain limits to the air volume requirement.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE NUMERALS

1 motor vehicle air conditioning unit
2 defrost outlet
3 side window outlet
4 side occupant air outlet
5 center occupant/additional vent air outlet
8 upper tier
9 middle tier
10 lower tier
11 central components in the instrument panel

What is claimed is:

1. An arrangement of air outlets of a motor vehicle air conditioning unit comprising:
   a first tier having a defrost outlet arranged therein, the defrost outlet configured for fluid communication with a defrost air discharge vent; and
   a second tier having a pair of center occupant air outlets arranged therein and a pair of side occupant air outlets arranged therein, the first tier spaced from the second tier in a first direction and the center occupant air outlets spaced from the side occupant air outlets in a second direction arranged perpendicular to the first direction, the pair of side occupant air outlets arranged in a central portion of the air conditioning unit with respect to the second direction and the pair of center occupant air outlets disposed laterally outwardly of the pair of side occupant air outlets to position the pair of side occupant air outlets intermediate the pair of center occupant air outlets with respect to the second direction, wherein the center occupant air outlets are configured for fluid communication with a pair of center occupant air discharge vents and the side occupant air outlets are configured for fluid communication with a pair of side occupant air discharge vents, wherein a flow of air flowing from a first one of the pair of side occupant air outlets towards a first one of the pair of side occupant air discharge vents flows past a first one of the pair of center occupant air outlets while flowing primarily in the second direction, wherein the first one of the pair of side occupant air outlets includes a lateral side extending in the first direction divided into a first portion and a second portion, wherein the flow of air flowing from the first one of the pair of side occupant air outlets towards the first one of the pair of side occupant discharge vents flows past the first portion of the lateral side of the first one of the pair of side occupant air outlets, and wherein the second portion of the lateral side of the first one of the pair of side occupant air outlets extends along an entirety of a lateral side of the first one of the pair of center occupant air outlets.

2. The arrangement of air outlets of claim 1, wherein each of the pair of side occupant air outlets and each of the pair of center occupant air outlets has a square cross-sectional shape.

3. The arrangement of air outlets of claim 1, wherein each of the pair of side occupant air outlets has a cross-sectional area equal to at least two times a cross-sectional area of each of the pair of center occupant air outlets.

4. The arrangement of air outlets of claim 1, further comprising a pair of side window outlets arranged in the first tier and configured for fluid communication with a pair of side window air discharge vents.

5. The arrangement of air outlets of claim 1, wherein the defrost outlet has a width equal to at least three times a width of each of the pair of side occupant air outlets and each of the pair of center occupant air outlets.

6. The arrangement of air outlets of claim 1, wherein the defrost outlet has a width that is equal to a width of the motor vehicle air conditioning unit.

7. The arrangement of air outlets of claim 1, wherein a height of a defrost outlet is equal to 30% to 70% of a height of each of the pair of side occupant air outlets.

8. The arrangement of air outlets of claim 1, further comprising a third tier disposed intermediate the first tier and the second tier.

9. The arrangement of air outlets of claim 8, further comprising a pair of side window outlets formed in the third tier and configured for fluid communication with a pair of side window air discharge vents.

10. The arrangement of air outlets of claim 9, wherein the pair of side window outlets is centrally arranged in the third tier.

11. The arrangement of air outlets of claim 1, wherein the pair of side occupant air outlets is centrally arranged in the second tier.

12. An arrangement of air outlets of a motor vehicle air conditioning unit comprising:
   a first tier having a defrost outlet arranged therein, the defrost outlet configured for fluid communication with a defrost air discharge vent; and
   a second tier having a pair of center occupant air outlets arranged therein and a pair of side occupant air outlets arranged therein, the first tier spaced from the second tier in a first direction and the center occupant air outlets spaced from the side occupant air outlets in a second direction arranged perpendicular to the first direction, the pair of side occupant air outlets arranged in a central portion of the air conditioning unit with respect to the second direction and the pair of center occupant air outlets disposed laterally outwardly of the pair of side occupant air outlets to position the pair of side occupant air outlets intermediate the pair of center occupant air outlets, wherein the center occupant air outlets are configured for fluid communication with a pair of center occupant air discharge vents and the side occupant air outlets are configured for fluid communication with a pair of side occupant air discharge vents, wherein a flow of air flowing from a first one of the pair of side occupant air outlets towards a first one of the pair of side occupant air discharge vents flows past a first one of the pair of center occupant air outlets while flowing primarily in the second direction, wherein the first one of the pair of side occupant air outlets includes a lateral side extending in the first direction divided into a first portion and a second portion, wherein the flow of air flowing from the first one of the pair of side occupant air outlets towards the first one of the pair of side occupant discharge vents flows past the first portion of the lateral side of the first one of the pair of side occupant air outlets, and wherein the second portion of the lateral side of the first one of the pair of side occupant air outlets extends along an entirety of a lateral side of the first one of the pair of center occupant air outlets, and wherein each of the pair of side occupant air outlets has a cross-sectional area equal to at least two times a cross-sectional area of each of the pair of center occupant air outlets.

13. The arrangement of air outlets of claim 12, wherein each of the pair of side occupant air outlets and each of the pair of center occupant air outlets has a square cross-sectional shape.

14. The arrangement of air outlets of claim 12, further comprising a pair of side window outlets arranged in the first tier and configured for fluid communication with a pair of side window air discharge vents.

15. The arrangement of air outlets of claim 12, wherein the defrost outlet has a width equal to at least three times a width of each of the pair of side occupant air outlets and each of the pair of center occupant air outlets.

16. The arrangement of air outlets of claim 12, further comprising a third tier disposed intermediate the first tier and the second tier, and a pair of side window outlets arranged in the third tier and configured for fluid communication with a pair of side window air discharge vents.

* * * * *